United States Patent [19]

Coombs

[11] 4,238,933
[45] Dec. 16, 1980

[54] ENERGY CONSERVING VAPOR COMPRESSION AIR CONDITIONING SYSTEM

[76] Inventor: Murray Coombs, 20206 Germain St., Chatsworth, Calif. 91311

[21] Appl. No.: 883,229

[22] Filed: Mar. 3, 1978

[51] Int. Cl.³ .................. F25B 27/02; F25B 13/00
[52] U.S. Cl. ......................... 62/238 E; 62/324 D
[58] Field of Search .............. 62/238, 324, 196 B, 62/79

[56] References Cited

U.S. PATENT DOCUMENTS

| | | | |
|---|---|---|---|
| 1,874,803 | 8/1932 | Reed | 62/238 E |
| 2,751,761 | 6/1956 | Borgerd | 62/238 E |
| 3,188,829 | 6/1965 | Siewert et al. | 62/238 E |
| 3,926,008 | 12/1975 | Webber | 62/238 E |
| 3,984,050 | 10/1976 | Gustafsson | 62/238 E |
| 4,019,338 | 4/1977 | Poteet | 62/238 E |
| 4,024,728 | 5/1977 | Gustafsson | 62/238 E |

OTHER PUBLICATIONS

*Air Conditioning, Heating & Refrigeration News*, Jan. 9, 1978 p. 21.

*Air Conditioning, Heating & Refrigeration News*, Jun. 6, 1977, p 20.

*Primary Examiner*—Lloyd L. King
*Attorney, Agent, or Firm*—Lyon & Lyon

[57] ABSTRACT

An air conditioning system which reduces energy consumption by disposing of the waste heat to a low temperature heat sink, at the same time recovering useful energy. An auxiliary liquid cooled condenser is connected in parallel with the air condenser of a conventional vapor compression air conditioning system through a valve located between the compressor of the existing system and the condensers. When the valve is actuated the refrigerant of the air conditioning system is routed from the air condenser and instead flows through the liquid cooled condenser assembly in heat exchange relationship with a body of fluid which is at a lower temperature than the ambient air, such as water from a swimming pool or from a municipal water supply. The valve also serves to exhaust refrigerant from the unused condenser. Maximum energy conservation is achieved by use of the total heat content of the refrigerant rather than only the high-temperature heat as in those prior art systems designed as a principal heat source.

12 Claims, 3 Drawing Figures

ENERGY CONSERVING VAPOR COMPRESSION AIR CONDITIONING SYSTEM

BACKGROUND OF THE INVENTION

The present invention relates to air conditioning systems, and more particularly to modifications of such systems to reduce power consumption and recover waste heat.

Most home and small commercial air conditioning systems employ a closed vapor compression/expansion cycle with heat rejection to ambient air. Such systems include an evaporator portion with a refrigerant expansion valve, an evaporator, and a house air circulation fan, and a condenser portion with a compressor, an air condenser, and an air condenser fan. Warm air is passed over the evaporator coil, where it is cooled by the transfer of heat to the liquid refrigerant flowing therethrough. The cooled air then passes to the interior of the building or other enclosure desired to be cooled. The refrigerant is converted to a vapor by absorbing the heat from the warm air. The vaporized refrigerant then flows to a compressor where it is compressed to a high pressure vapor, in the process being heated to a temperature higher than the temperature of the available heat sink medium. The vapor then flows to the condenser, where it is condensed to a liquid by transfer of its sensible and latent heat to the heat sink medium, which is typically ambient air. The high pressure liquid then flows through a throttling device such as an expansion valve or capillary tube, where the pressure and temperature of the liquid are reduced to the conditions existing in the evaporator. In particular, the temperature of the liquid refrigerant is reduced to a point below the temperature of the air being cooled, thus completing the refrigerant cycle.

According to the basic thermodynamics of the vapor compression refrigeration cycle just described, the amount of energy required to operate the compressor is a function of the pressure and temperature of the refrigerant in the evaporator and the condenser. The condenser pressure and temperature are in turn dependent upon the temperature of the heat sink medium, typically ambient air. In general, the power consumed by the compressor is thus directly proportional to the temperature of the heat sink medium. Consequently, it is advantageous to utilize a low temperature heat sink medium where possible to reduce the power consumption of the compressor. In larger commercial applications this is often accomplished by the use of cooling towers, wherein water is used to absorb the waste heat from the air conditioner and is subsequently evaporated to ambient air. The evaporation process effectively reduces the heat sink temperature of the air conditioner.

It may also be desirable to further conserve energy by recovering the heat rejected to the heat sink medium rather than rejecting the heat to the ambient air. It is well known in the art that the power consumption of an air conditioning system can be decreased by the use of a low temperature heat sink medium, while at the same time recovering the rejected heat for useful purposes. Systems utilizing swimming pool water as a heat sink medium, wherein the need for a swimming pool heater is reduced or eliminated by the simultaneous heating of the water, are disclosed in Poteet U.S. Pat. No. 4,019,338; Davies U.S. Pat. No. 3,976,123; and Webber U.S. Pat. No. 3,926,008. Systems for rejecting the waste heat of a refrigeration system or heat pump to a domestic water supply, thereby heating the water, are disclosed in Schmidt U.S. Pat. No. 3,916,638, and Wetherington, Jr. et al. U.S. Pat. No. 3,922,876.

The above-mentioned systems differ from the present invention in several important aspects, particularly with respect to energy conservation. The patents to Wetherington, Jr. et al, Schmidt and Davies, and one embodiment of the patent to Webber, describe a system wherein the liquid cooled heat exchanger is placed in series with the compressor and the condenser of a conventional refrigeration loop. The disadvantage of such a series arrangement is that it results in a higher refrigerant pressure loss through the system than exists in a conventional refrigeration loop, because the refrigerant must pass through both condensers during every cycle. Instead of conserving energy in the air conditioning loop, these systems actually require more energy for compressor operation than does a conventional system.

in the patent to Poteet, and in another embodiment of the patent to Webber, systems are disclosed wherein the liquid cooled heat exchanger is plumbed in parallel with the air condenser of the conventional refrigeration loop. However, these systems make no provision for refrigerant level control to exhaust the liquid refrigerant from the unused condenser. The refrigerant level may therefore vary significantly throughout The loop, and in particular the refrigerant may tend to collect in the unused condenser because of the temperature differential between the condensers. Thus these systems may require additional energy for adequate compressor operation instead of achieving energy conservation. Further, these systems as disclosed provide for the condenser to be submerged in the swimming pool, a configuration that greatly increases the refrigerant pressure drop due to the length of the plumbing required and leads to a potential loss of liquid subcooling.

The patents to Davies, Webber and Poteet also contain disadvantages with respect to energy conservation in their utilization of the waste heat of the air conditioning system. These patents describe systems wherein the swimming pool water flows continuously through the water side of the liquid cooled condenser, which is placed in series with the existing pool pump and filter system. The resulting pressure loss through the pool filter loop when the air conditioner is inoperative requires increased energy input to the pool pump, thus failing to conserve energy in the overall system.

A further disadvantage of the patent to Wetherington, Jr. et al and like patents related to the art of heating water for a domestic water supply with the waste heat of an air conditioning system, is that these patents utilize only the "superheat" portion of the waste heat for heating, exhausting the remaining heat through a conventional air condenser. The amount of energy available in the superheat region is quite small compared to the total energy available in the superheat, condensing and subcooling regions, and therefore these systems do not achieve maximum energy conservation and utilization. The system disclosed in the patent to Schmidt avoids this problem by using two water-cooled condensers, but is therefore limited in its ability to be retrofitted into an existing air conditioning system having an air condenser.

SUMMARY OF THE INVENTION

According to the present invention there is provided a vapor compression air conditioning system utilizing a low temperature heat sink for achieving decreased compressor power, wherein the refrigerant level is managed to provide further efficiency, and whereby the waste heat may be recovered to perform useful work such as heating an external fluid medium. The system contemplates the addition to a conventional air conditioning system of a valve such as a heat pump reversing valve used as a diverting and exhausting valve between the compressor and the air condenser, such that a liquid cooled condenser may be connected through the valve in parallel with the existlng air condenser. The valve permits the flow of refrigerant through either the air condenser or the liquid cooled condenser as desired, but not through both simultaneously. The inefficient refrigerant pressure drop of the series configurations disclosed in the prior art is thereby avoided. Check valves are provided between the evaporator and the two condensers to ensure that refrigerant does not flow through the inactive condenser, and the valve is connected to the inlet side of the compressor to exhaust refrigerant from the inactive condenser and route it to the active condenser. A liquid refrigerant receiver may be located in the liquid cooled condenser line to collect any excess liquid refrigerant that may accumulate as a result of the smaller volume of the liquid cooled condenser as compared to that of the air condenser, although if the size of the liquid cooled condenser is properly chosen such a receiver would be unnecessary.

In the embodiment of the present invention for exhausting the waste heat of the air conditioner to swimming pool water, a valve is inserted in the existing pool plumbing connecting the pump, filter, and related equipment. The valve diverts the pool water through the liquid cooled condenser before it returns to the pool, in the process heating the water and condensing the pressurized refrigerant by means of the heat exchange relationship therebetween. A pressure relief valve may be provided to accommodate variations in air conditioner capacity and pool plumbing variables. If the pool water is heated to a maximum desired temperature, the diversion valve may be opened and the refrigerant routed through the air condenser, thus returning the systems to their conventional operation.

In the embodiment of the present invention wherein the waste heat of the air conditioner is exhausted to a domestic or commercial water supply, the entire heat energy available in the refrigerant is exhausted by circulating the refrigerant through the length of a tank supplied with cold water. If the water in the tank is heated to a maximum desired temperature, but there remains a demand for cold water which may be somewhat increased in temperature without becoming unacceptable to the user, a cold water bypass may be mixed with an intermediate temperature discharge from the tank to provide a continuing low temperature heat sink. Hot and warm water reservoirs may be utilized if desired. If the maximum desirable heat has been absorbed and no demand for cold water exists, the water condenser may be removed from the system and the air condenser utilized in a conventional manner.

Accordingly, it is an object of the present invention to provide an energy conserving vapor compression air conditioning system.

It is another object of the present invention to further conserve energy by recovering the waste heat of an energy conserving vapor compression air conditioning system and performing useful work therewith.

These and other objects and advantages of the present invention will become apparent from the following detailed description taken in conjunction with the accompanying drawings.

DETAILED DESCRIPTION OF THE PREFERRED EMBODIMENTS

Figure 1:
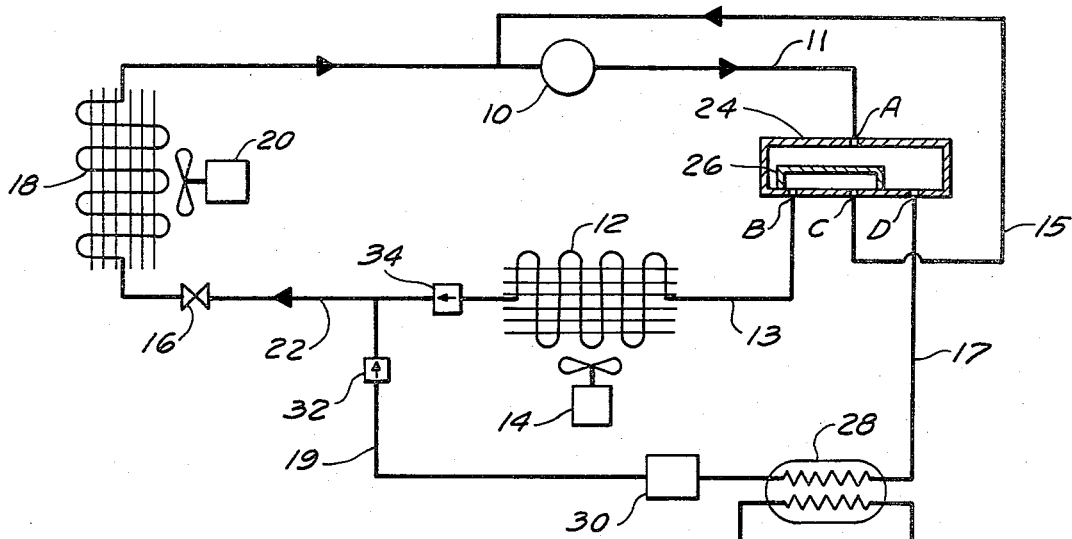
FIG. 1 is a schematic illustration of one embodiment of the present invention.
Figure 1:
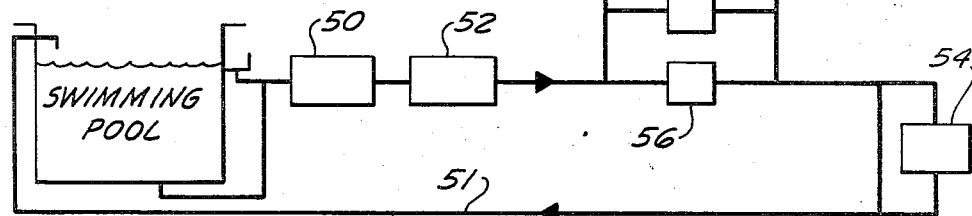

FIG. 1 illustrates a modification of a conventional vapor compression air conditioning system in accordance with the present invention. The elements of the conventional system include a compressor 10, an air condenser 12 with an associated fan 14, a throttle valve or expansion valve 16, and an evaporator 18 with an associated circulation fan 20, all of the elements being connected through a refrigerant conduit means 22 such as a pipe. According to the present invention there is inserted between the compressor 10 and the air condenser 12 a four-way valve 24, which includes an inlet port A, an internal sliding element 26 for selectively blocking off certain of the exit parts, and three exit ports B, C and D. The inlet port A receives compressed refrigerant from the compressor 10 through the pipe portion 11. The exit port B is connected through the pipe portion 13 to the air condenser 12 as in the conventional system. The exit port C is connected through the pipe portion 15 to the inlet side of the compressor 10, and the exit port D is connected through the pipe portion 17 to a liquid cooled condenser assembly 28. Connected to the outlet side of the liquid cooled condenser 28 may be a liquid refrigerant receiver 30. The receiver 30 is connected through a pipe portion 19 and a check valve 32 back into the pipe 22. A second check valve 34 is also provided and is located between the air condenser 12 and the junction of the pipe portion 19 and the pipe 22.

In operation, the sliding element 26 of the valve 24 is positioned as shown in FIG. 1 so as to cover the exit ports B and C, and thus to allow compressed refrigerant to flow from the compressor 10 through the pipe portion 11, the exit port D of the valve 24 and the pipe portion 17 to the liquid cooled condenser 28, where the compressed refrigerant is brought into heat exchange relationship with a low temperature heat sink medium in a manner to be illustrated in more detail below, and is condensed to a liquid. Excess liquid refrigerant may be collected in the receiver 30 in a conventional manner if necessary to achieve the proper volume and pressure of refrigerant for optimum operation of the system, although a receiver may not be necessary depending on the size of the liquid cooled condenser 28 and the operating parameters of the system. Thence the liquified refrigerant flows through the pipe portion 19 to the check valve 32, which is open, and returns to the conventional refrigeration loop for further use in the standard manner. In this mode of operation the check valve 34 is closed to prevent the introduction of liquid refrigerant from the pipe portion 19 into the air condenser 12. It will be observed from the positioning of the sliding element 26 of the valve 24 that the pipe portions 13 and 15 are connected through the exit ports B and C, so that the refrigerant vapor is pumped out of the inactive air condenser 12 and is returned to the compressor 10 for use in the system.

When it is desired not to have the refrigerant pass through the liquid cooled condenser 28, the sliding element 26 of the valve 24 is activated by a solenoid, not shown, and is moved to a position covering the exit ports C and D. The check valve 32 is closed and the check valve 34 is opened. Any refrigerant remaining in the liquid cooled condenser system is pumped from the pipe portion 17 through the ports C and D and the pipe portion 15 to the inlet of the compressor 10. The refrigerant from the compressor 10 flows through the pipe portion 11, the inlet port A, the exit port B, and the pipe portion 13 to the air condenser 12. The air condenser fan 13 is activated and the system operates in the conventional manner, exhausting its waste heat to the ambient air.

The assembly for directing liquid through the liquid side of the liquid cooled condenser 28 is as follows. In a conventional pool plumbing system including a pump 50, a filter 52 and a pool heater 54, if any, all connected by water conduit means 51 such as a pipe, a solenoid operated valve 56 is inserted, together with associated pipe portions 53 and 55, between the filter 52 and the heater 54. The pipe portion 53 is connected to the pipe 51 at the inlet side of the valve 56, and thence is connected through a thermistor 58 to the inlet of the liquid side of the liquid cooled condenser 28. The outlet side of the condenser 28 is connected to a water flow switch 60 through the pipe portion 55, and thence to a junction with the pipe 51 at the outlet side of the valve 56. A pressure relief valve 62 is plumbed in parallel with the valve 56 across the pipe portions 53 and 55.

In operation, the valve 56 is closed by a signal from a conventional solenoid, not shown, and water is diverted from the pipe 51 through the pipe portion 53, the thermistor 58 and the liquid cooled condenser 28 to the flow switch 60. When a minimum water flow through the circuit is established, the flow switch 60 is opened and remains open until the air conditioner is turned off. The water then returns to the pipe 51 via the pipe portion 55. The pressure relief valve permits an adjustable pressure drop across the liquid cooled condenser water circuit to accommodate variations in air conditioning capacity, pool plumbing variables and installation variables for optimum performance.

Next the thermistor 58 compares the pool water temperature to a predetermined set point temperature, after a time delay to assure that the thermistor 58 has reached the water temperature. If the water temperature is lower than the set point temperature, a signal is generated to activate the valve 24 of the air conditioning system to divert refrigerant to the liquid cooled condenser 28 as previously described. At the same time power is removed from the air condenser fan 14. The system then operates to exhaust the waste heat of the air conditioner to a lower temperature heat sink than is available by exhausting to ambient air, thus reducing the compressor power and at the same time achieving the performance of useful work by providing heat to the swimming pool water. If the water temperature is higher than the set point temperature, the valve 56 is opened to allow water to flow through the pool plumbing in the conventional manner, and the air conditioner system is operated conventionally by exhausting heat to the ambient air through the air condenser 12.

Figure 2:
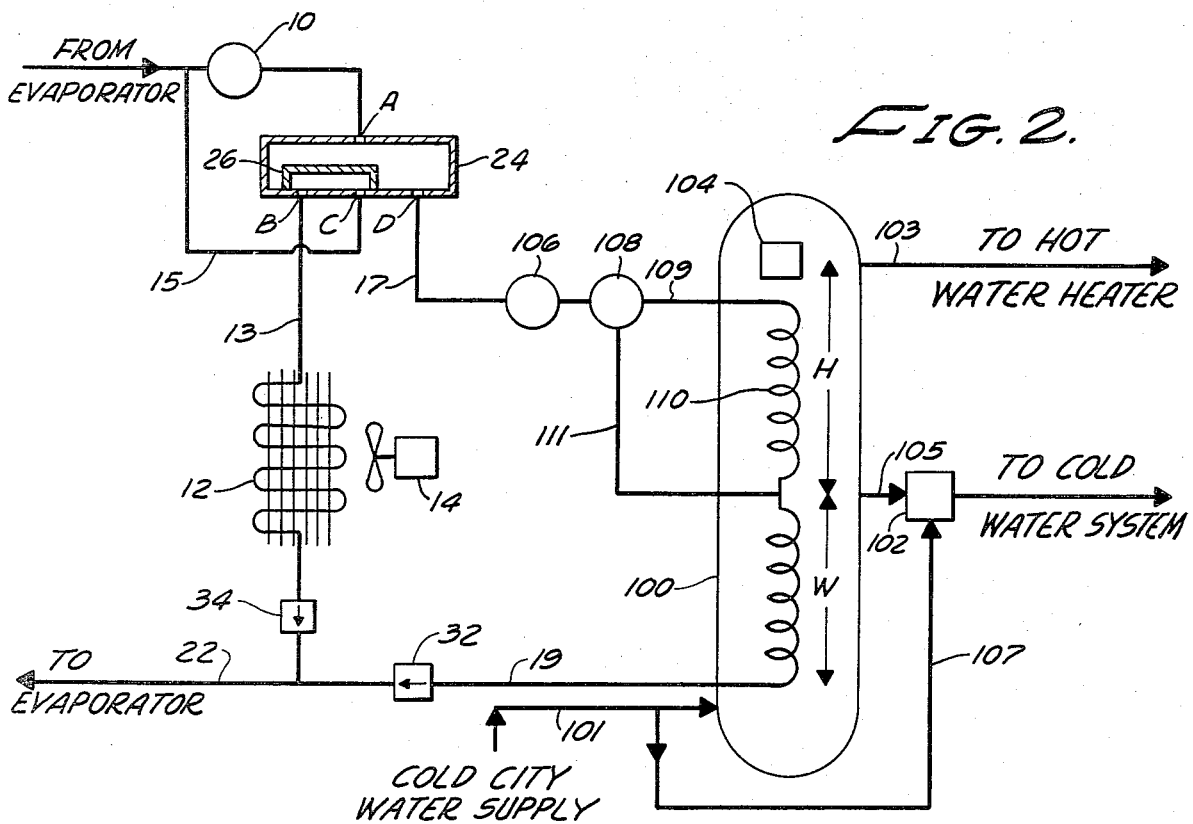
FIG. 2 is a schematic illustration of a second embodiment of the present invention.

A second embodiment of the present invention is illustrated in FIG. 2, whereby the waste heat of the air conditioning system may be exhausted to the cold water of, for example, a municipal water supply, at the same time heating the water for supply to a domestic or commercial hot water system. The elements of the conventional air conditioner and the valve are identical to those illustrated in FIG. 1, and are identified by the same reference numerals in FIG. 2. The system illustrated in FIG. 2 further includes a vertically mounted water tank 100 having a cold water inlet at the bottom for receiving cold water from a water supply through a pipe 101, a hot water discharge port at the top for discharging hot water through pipe 103, and an intermediate warm water discharge port for discharging warm water through pipe 105. A bypass line 107 may be employed to connect the cold water inlet pipe 101 with the warm water discharge pipe 105 at a thermostatically controlled mixing valve 102. A thermistor 104 is located inside the tank 100 and is connected to a control system, not shown.

The valve 24 is connected through the pipe 17 and a pressure switch 106 to a two-way temperature controlled valve 108. A condenser 110 is located inside the water tank 100 and may be a coiled copper tube spirally disposed throughout the length of the tank 100. The valve 108 is connected, via a pipe 109, to the top of the condenser 110, that is, to the portion nearest the top of the tank 100 and to an intermediate point in the condenser 110 through a pipe 111. For purposes of description the water tank 100 may be thought of as having two temperature zones; a hot water zone H located between the hot water discharge and the warm water discharge, and a warm water zone W located between the warm water discharge and the cold water inlet.

In operation, the valve 24 is actuated in the manner previously described to deliver compressed refrigerant to the pipe portion 17. At the same time the air condenser fan is switched off. The refrigerant flows through the pressure switch 106 to the valve 108, and then to the top of the water condenser 110 through the pipe 109. The refrigerant is condensed and is returned to the air conditioning system through the pipe portion 19 and the check valve 32. In this mode of operation the check valve 32 is open and the check valve 34 is closed, as previously described with respect to FIG. 1. When there is a demand for hot water the water is extracted from the zone H and is delivered for use as desired through the pipe 103. The water may pass to an auxiliary hot water heater, not shown, for further heating to the final desired temperature if necessary.

When there is a demand for cold water it is supplied through the bypass line 107 and the mixing valve 102. The mixing valve 102 mixes warm water from the zone W with the cold water from the bypass line 107 to provide cool water up to a selectable maximum temperature acceptable to the user. This temperature setting determines the heat capacity of the heat sink available to the air conditioner and permits reduced compressor power demand within the limits of the temperature setting.

When the temperature of the water in the zone H reaches a maximum predetermined temperature, as sensed by the thermistor 104, the temperature controlled valve 108 is activated to divert the compressed refrigerant to the pipe 111 to enter the condenser 110 at an intermediate point coinciding approximately with the top of the zone W. This configuration provides for the situation in which there may be no hot water demand but a large cold water demand. Under these conditions the waste heat of the air conditioner cannot be recovered to perform useful work, but an advantage in compressor power savings may still be realized by rejecting the heat to the cold water heat sink.

If there is no demand for either hot or cold water the water temperature in the tank 100 will gradually rise to a maximum level, increasing at the same time the pressure and temperature of the refrigerant in the condenser 110. At a preset refrigerant pressure the pressure switch 106 will be activated to indicate that water cooling is no longer possible, and the control system, not shown, will return the valve 24 to the conventional air conditioning configuration and will activate the air condenser fan 14. After a suitable time delay sufficient to prevent rapid cycling between the air condensing and water condensing modes, water cooling is again attempted and the pressure switch 106 functions either to permit a return to water cooling or to remain in the air cooling mode, in accordance with the sensed pressure conditions. Alternatively, a thermostat located in the zone W could be employed to sense the temperature of the water in the tank 100 and return the system to the water condensing mode upon sensing a predetermined minimum temperature level. A pressure relief valve, not shown, may be employed to protect the tank 100 against overpressure conditions.

As the compressed refrigerant enters the water condenser 100, it is desuperheated, condensed and subcooled to a temperature somewhat above the temperature of the cold water, before returning to the pipe portion 19. Heat transfer to the water takes place by natural convection and forced convection, that is, without water flow and with water flow. The desuperheating takes place near the top of the tank 100 with little or no water flow, and if hot water is not withdrawn from the tank 100 a temperature gradient is established throughout the length of the tank. The extraction of warm water at an intermediate level to be mixed with the cold water supply, in the many installations wherein a moderate increase in the cold water temperature would be unobjectionable, provides a further opportunity to achieve the advantage of reduced compressor power even after the water is otherwise heated to the maximum desired temperature. The heat delivered to the warm water in the zone W which is subsequently mixed with cold water is not recovered, although as hot water is extracted from the top of the tank 100 the warm water flows from the zone W to the zone H and the heat is recovered.

The system shown and described is a dynamic one, the temperature of the water at a given point in the tank 100 being determined by the hot and cold water flow rates and temperatures, the air conditioner load, and the tank volume. The tank volume determines the thermal storage capacity of the system. The specific design parameters of the system will depend on the requirements of the application and optimization of the energy savings by balancing the capital costs, water usage, and energy consumption of any auxiliary heaters against the energy savings achieved by the system.

Figure 3:
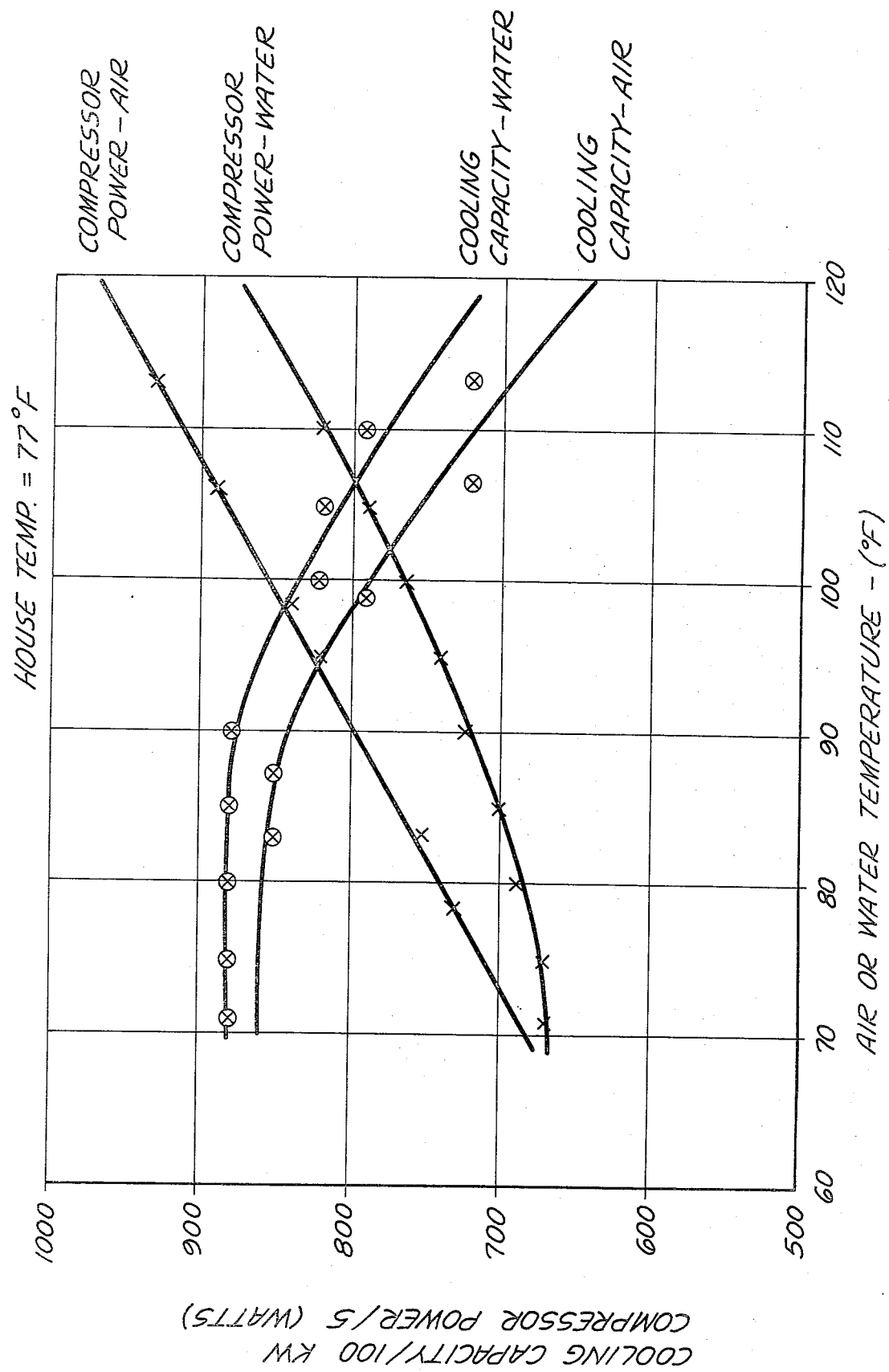
FIG. 3 is a graph of experimental data illustrating the energy conservation achieved by a system constructed in accordance with the embodiment of the present invention illustrated in FIG. 1.

FIG. 3 is a graph of experimental data taken from the operation of a system built in accordance with the embodiment of the present invention illustrated in FIG. 1. The evaporator assembly was placed in an insulated box whose temperature was maintained at 77° F. by a large capacity resistance heater. The air condenser assembly was similarly placed in an insulated box with controlled temperature ambient air. The liquid cooled condenser was placed in the same box for purposes of the experiment.

The graph of FIG. 3 provides a comparison between the air condenser mode and the water condenser mode in terms of both compressor power usage and air conditioner cooling capacity. The decrease in compressor power usage and the increase in cooling capacity when the water condenser is utilized are apparent. For example, the extreme case of 110° F. ambient air and 80° F. pool water yielded a compressor power saving of 24.3 percent and a cooling capacity increase of 22.2 percent, for a total electrical power saving of 41.4 percent. The power saving was significant throughout the remainder of the range of reasonable operating conditions. A further power saving, of course, is realized by the delivery of heat to the pool that would otherwise be supplied by the burning of natural gas. For example, a five ton air conditioner would deliver approximately 75,000 BTU/hr., which is approximately 25 percent of the heat supplied by an average gas-fired pool heater for home use.

Thus, there has been provided by the present invention a system that achieves a maximum conservation of energy required to operate the air conditioner as well as a maximum recovery of exhausted heat for useful purposes, within the constraints established by the particular application.

Many variations and modifications of the present invention would be apparent without departing from the spirit thereof, and it is intended that all such variations and modifications be included within the scope of the appended claims.

I claim:

1. An energy conserving vapor compression air conditioning system, comprising
    a compressor,
    an evaporator,
    an air cooled condenser,
    conduit means for connecting said compressor, said evaporator, and said air cooled condenser into a continuous loop,
    a liquid cooled condenser connected to said conduit means in parallel with said air cooled condenser,
    means for selectively providing a refrigerant flowing through said conduit means to either said air cooled condenser or said liquid cooled condenser, and
    means for exhausting excess refrigerant from the non-selected condenser and returning the excess refrigerant to the selected condenser.

2. A system according to claim 1 wherein said means for selectively providing a refrigerant to either said air cooled condenser or said liquid cooled condenser comprises a four way valve.

3. A system according to claim 1 wherein said liquid cooled condenser is cooled by water provided by the water circulation system of a swimming pool.

4. A system according to claim 3 wherein said water for cooling said liquid cooled condenser is provided by conduit means plumbed in parallel with said swimming pool water circulation system.

5. A system according to claim 4 wherein said swimming pool water circulation system includes valve means for selectively providing said water to said liquid cooled condenser or diverting said water therefrom.

6. A system according to claim 1 wherein said liquid cooled condenser is disposed in a tank of water to be heated.

7. A system according to claim 6 wherein said tank is supplied by a cold water supply and includes a hot water outlet.

8. A system according to claim 7 wherein said tank further includes a warm water outlet.

9. Apparatus for reducing the energy consumption of a vapor compression air conditioning system having a compressor and a first condenser, said apparatus comprising
valve means,
means for connecting said valve means between said compressor and said first condenser,
a second condenser adapted to be liquid cooled connected to said valve means,
means for connecting said second condenser to said system in parallel with said first condenser,
means for selectively providing refrigerant from said compressor to either said first condenser or said second condenser, and
means for exhausting excess refrigerant from the non-selected condenser and returning the excess refrigerant to the selected condenser.

10. Apparatus as in claim 9 wherein said means for selectively providing refrigerant to either said first or said second condenser comprises a four way valve.

11. Apparatus as in claim 9 wherein said second condenser includes means for diverting water from a swimming pool to provide a heat sink medium.

12. In a vapor compression air conditioning system having an air cooled condenser, the improvement comprising
a four way valve connected between the compressor and the air cooled condenser of said system, and
a liquid cooled condenser connected at one end thereof to an output of said four way valve and at the other end thereof to the air conditioning system in parallel with the air cooled condenser of said system,
said four way valve including means for selectively providing refrigerant to an active one of said condensers while exhausting excess refrigerant from the other inactive condenser and returning the excess refrigerant to the active condenser.

* * * * *